(12) United States Patent
Borrowman et al.

(10) Patent No.: US 12,128,448 B2
(45) Date of Patent: Oct. 29, 2024

(54) SEED SORTING

(71) Applicant: Monsanto Technology LLC, St. Louis, MO (US)

(72) Inventors: Eric L. Borrowman, St. Peters, MO (US); Jarrett R. Ceglinski, St. Louis, MO (US); Govind Chaudhary, Maryland Heights, MO (US); Xiaofei Fan, Chesterfield, MO (US); Jeffrey L. Kohne, Kirkwood, MO (US); Brad D. White, Creve Coeur, MO (US); Chi Zhang, Chesterfield, MO (US)

(73) Assignee: MONSANTO TECHNOLOGY LLC, Saint Louis, MO (US)

( * ) Notice: Subject to any disclaimer, the term of this patent is extended or adjusted under 35 U.S.C. 154(b) by 0 days.

(21) Appl. No.: 16/635,781

(22) PCT Filed: Jul. 31, 2018

(86) PCT No.: PCT/US2018/044566
§ 371 (c)(1),
(2) Date: Jan. 31, 2020

(87) PCT Pub. No.: WO2019/027998
PCT Pub. Date: Feb. 7, 2019

(65) Prior Publication Data
US 2021/0129188 A1    May 6, 2021

Related U.S. Application Data

(60) Provisional application No. 62/539,250, filed on Jul. 31, 2017.

(51) Int. Cl.
*B07C 5/342* (2006.01)
*B07C 5/00* (2006.01)
(Continued)

(52) U.S. Cl.
CPC ............ *B07C 5/3425* (2013.01); *B07C 5/368* (2013.01); *G01N 21/85* (2013.01)

(58) Field of Classification Search
CPC ..... B07C 5/3425; B07C 5/342; B07C 5/3422; B07C 5/368; G01N 21/85; B65G 15/60; B65G 20/005
(Continued)

(56) References Cited

U.S. PATENT DOCUMENTS 2,849,619 A    8/1958 Eisfeldt
3,177,360 A    4/1965 Hague et al.
(Continued)

FOREIGN PATENT DOCUMENTS

CN    103347381 A    10/2013
CN    204762022 U    11/2015
(Continued)

OTHER PUBLICATIONS

Bert Handschick, "Machine for the Production of Defined Fuel Qualities (English Translation)", May 2004, worldwide.espacenet.com (Year: 2004).*
(Continued)

*Primary Examiner* — Michael McCullough
*Assistant Examiner* — Molly K Devine
(74) *Attorney, Agent, or Firm* — Harness, Dickey & Pierce, P.L.C.

(57) ABSTRACT

A seed sorting system for sorting seeds includes a seed transfer station configured to move seeds through the system. An imaging assembly includes a first camera mounted above the seed transfer station and configured to acquire images of the seeds as the seeds move through the system and a second camera mounted below the seed transfer station and configured to acquire images of the seeds as the seeds move through the system. A sorting assembly is
(Continued)

configured to sort the seeds into separate bins based on the acquired images of the seeds.

20 Claims, 13 Drawing Sheets

(51) Int. Cl.
*B07C 5/36* (2006.01)
*G01N 21/85* (2006.01)

(58) Field of Classification Search
USPC .......................................... 209/552; 198/811
See application file for complete search history.

(56) References Cited

U.S. PATENT DOCUMENTS

| | | | | |
|---|---|---|---|---|
| 3,260,354 | A * | 7/1966 | Chiddister | B65G 16/60 |
| | | | | 198/811 |
| 3,488,495 | A | 1/1970 | Schneeman | |
| 3,768,645 | A | 10/1973 | Conway et al. | |
| 3,928,753 | A * | 12/1975 | Kivett | G06M 1/101 |
| | | | | 377/6 |
| 4,273,649 | A * | 6/1981 | Leverett | B07C 5/18 |
| | | | | 209/912 |
| 4,357,535 | A | 11/1982 | Haas | |
| 4,809,308 | A | 2/1989 | Adams et al. | |
| 4,922,092 | A | 5/1990 | Rushbrooke et al. | |
| 5,113,425 | A | 5/1992 | Zweig | |
| 5,289,921 | A | 3/1994 | Rodrigo et al. | |
| RE35,423 | E | 1/1997 | Adams et al. | |
| 5,865,299 | A * | 2/1999 | Williams | B65G 15/60 |
| | | | | 198/811 |
| 5,973,286 | A * | 10/1999 | Wan | B07C 5/365 |
| | | | | 209/939 |
| 6,145,650 | A | 11/2000 | Christ et al. | |
| 6,427,128 | B1 | 7/2002 | Satake et al. | |
| 7,082,185 | B2 | 7/2006 | Freifeld et al. | |
| 7,105,813 | B2 | 9/2006 | Lee | |
| 7,218,775 | B2 * | 5/2007 | Kokko | G06V 20/69 |
| | | | | 382/156 |
| 7,529,338 | B2 | 5/2009 | Fung et al. | |
| 7,742,564 | B2 | 6/2010 | Parham et al. | |
| 7,816,616 | B2 | 10/2010 | Kenny et al. | |
| 8,189,901 | B2 | 5/2012 | Modiano et al. | |
| 8,488,863 | B2 * | 7/2013 | Boucheron | G06T 7/11 |
| | | | | 382/133 |
| 9,157,855 | B2 | 10/2015 | Tin et al. | |
| 9,188,553 | B2 | 11/2015 | Sakuta et al. | |
| 9,492,130 | B2 | 11/2016 | Flagle et al. | |
| 9,545,724 | B2 | 1/2017 | Bonora et al. | |
| 9,865,424 | B2 | 1/2018 | Ikeda et al. | |
| 10,078,093 | B2 | 9/2018 | Flagle et al. | |
| 10,207,296 | B2 | 2/2019 | Garcia et al. | |
| 10,345,479 | B2 | 7/2019 | Langeveld et al. | |
| 10,512,942 | B2 | 12/2019 | Tandon | |
| 10,557,805 | B2 | 2/2020 | Chaudhary et al. | |
| 10,697,909 | B2 | 6/2020 | Loeffler et al. | |
| 10,830,711 | B2 | 11/2020 | Kondo | |
| 11,020,066 | B2 | 6/2021 | Butani et al. | |
| 11,044,843 | B2 | 6/2021 | Kotyk et al. | |
| 11,083,426 | B2 | 8/2021 | Defreitas et al. | |
| 11,116,184 | B2 | 9/2021 | Gomez et al. | |
| 2001/0022830 | A1 | 9/2001 | Sommer et al. | |
| 2003/0112440 | A1 | 6/2003 | Fukumori et al. | |
| 2004/0218716 | A1 | 11/2004 | Freifeld et al. | |
| 2005/0056777 | A1 | 3/2005 | Lee | |
| 2005/0226465 | A1 | 10/2005 | Fujita et al. | |
| 2006/0176642 | A1 * | 8/2006 | George | B67D 7/3236 |
| | | | | 361/220 |
| 2007/0012604 | A1 | 1/2007 | Basford | |
| 2007/0291896 | A1 | 12/2007 | Parham et al. | |
| 2008/0308472 | A1 | 12/2008 | Osiensky et al. | |
| 2008/0310674 | A1 | 12/2008 | Modiano et al. | |
| 2010/0143906 | A1 * | 6/2010 | Becker | G01N 21/85 |
| | | | | 209/3.3 |
| 2011/0122994 | A1 | 5/2011 | Grubsky et al. | |
| 2011/0202169 | A1 | 8/2011 | Koehler et al. | |
| 2011/0210047 | A1 | 9/2011 | Deppermann | |
| 2012/0085686 | A1 * | 4/2012 | Radema | B07C 5/3412 |
| | | | | 209/552 |
| 2013/0079918 | A1 | 3/2013 | Spencer et al. | |
| 2013/0126399 | A1 | 5/2013 | Wolff | |
| 2013/0176553 | A1 | 7/2013 | Cope et al. | |
| 2013/0229647 | A1 | 9/2013 | Fredlund et al. | |
| 2013/0231585 | A1 | 9/2013 | Flagle et al. | |
| 2014/0050365 | A1 | 2/2014 | Conrad et al. | |
| 2014/0058557 | A1 | 2/2014 | Becker et al. | |
| 2014/0257135 | A1 | 9/2014 | DeFreitas et al. | |
| 2014/0286474 | A1 | 9/2014 | Sakuta et al. | |
| 2015/0135585 | A1 | 5/2015 | Cope et al. | |
| 2015/0165484 | A1 | 6/2015 | Deppermann et al. | |
| 2015/0177067 | A1 | 6/2015 | Golgotiu et al. | |
| 2015/0179391 | A1 | 6/2015 | Ikeda et al. | |
| 2015/0321353 | A1 | 11/2015 | McCarty, II et al. | |
| 2016/0250665 | A1 | 9/2016 | Lampe | |
| 2016/0327478 | A1 | 11/2016 | Hilscher et al. | |
| 2017/0131311 | A1 | 5/2017 | Flagle et al. | |
| 2017/0295735 | A1 | 10/2017 | Butruille et al. | |
| 2018/0029086 | A1 | 2/2018 | Prystupa et al. | |
| 2018/0217072 | A1 | 8/2018 | Chaudhary et al. | |
| 2019/0281781 | A1 | 9/2019 | Borrowman et al. | |
| 2019/0285558 | A1 | 9/2019 | Defreitas et al. | |
| 2019/0307055 | A1 | 10/2019 | Kotyk et al. | |
| 2019/0346471 | A1 | 11/2019 | Flagle et al. | |
| 2019/0374978 | A1 | 12/2019 | Borrell et al. | |
| 2020/0015409 | A1 | 1/2020 | de Bruin et al. | |
| 2020/0055093 | A1 | 2/2020 | Arlinghaus | |
| 2020/0086353 | A1 | 3/2020 | Becker et al. | |
| 2020/0182807 | A1 | 6/2020 | Butani et al. | |
| 2021/0129188 | A1 | 5/2021 | Borrowman et al. | |
| 2021/0140900 | A1 | 5/2021 | Borrowman et al. | |
| 2022/0039766 | A1 | 2/2022 | Defreitas et al. | |

FOREIGN PATENT DOCUMENTS

| | | | |
|---|---|---|---|
| CN | 106650802 A | 5/2017 | |
| CN | 107238620 A | 10/2017 | |
| CN | 107683183 A | 2/2018 | |
| DE | 202004007111 U1 * | 8/2004 | C10L 5/46 |
| DE | 102004063769 | 7/2006 | |
| DE | 10 2010 030908 A1 | 1/2012 | |
| EP | 1 046 902 A2 | 10/2000 | |
| EP | 1 743 713 A1 | 1/2007 | |
| FR | 2549963 | 2/1985 | |
| JP | 2014060957 A | 4/2014 | |
| JP | WO2016133175 A1 | 1/2018 | |
| KR | 101341815 B1 | 1/2014 | |
| UA | 123384 C2 | 3/2021 | |
| WO | 2008/150903 A1 | 12/2008 | |
| WO | WO-2009093905 A1 | 7/2009 | |
| WO | WO-2010138574 A1 | 12/2010 | |

OTHER PUBLICATIONS

International Search Report for PCT/US2018/044566, Oct. 15, 2018, 8 pages.

IN 5725/CHENP/2012 A (Ideal System Co., Ltd) Jun. 29, 2012, 62 pages.

European Communication Pursuant to Rule 164(1) EPC for Application No. 18841655.6, Mar. 3, 3021, 13 pages, Munich, Germany.

European Extended Search Report for Application No. 18841655.6, Jun. 7, 2021, 11 pages, Munich, Germany.

Jiang, et al., "GPheno Vision: A Ground Mobile System with Multi-modal Imaging for Field-Based High Throughput Phenotyping of Cotton," Scientific Reports, Jan. 19, 2018, pp. 1-15. (15 Pgs).

S. K. Kamra, The X-ray Contrast Method for Testing Germinability of *Picea abies* (L.) *karst*. seed, Studia Forestalia Suecica Nr. 90, 1971, 28 pages, Skogshogskolan, Royal College of Forestry, Stockholm. (28 Pgs).

(56) References Cited

OTHER PUBLICATIONS

U.S. Appl. No. 17/096,405, filed Nov. 11, 2020, Borrowman et al.
U.S. Appl. No. 16/352,484, filed Mar. 13, 2019, Borrowman et al.
U.S. Appl. No. 16/496,883, filed Sep. 23, 2019, Becker et al.
U.S. Appl. No. 17/251,057, filed Dec. 10, 2020, Borrowman et al.
U.S. Appl. No. 16/271,005, filed Feb. 8, 2019, Kotyk et al.
CN106650802A: CN106650802A is not in the English language, but an English language translation is included.
FR2549963: FR2549963 is not in the English language, but an English language translation is included.
CN103347381A: CN103347381A is not in the English language, but an English language translation is included.
CN107238620A: CN107238620A is not in the English language, but an English language translation is included.
JP-WO2016133175-A1: JP-WO2016133175-A1 is not in the English language, but an English language translation is included.
CN-204762022-U: CN-204762022-U is not in the English language, but an English language translation is included.
JP-2014060957-A: JP-2014060957-A is not in the English language, but an English language translation is included.
KR-101341815-B1: KR-101341815-B1 is not in the English language, but an English language translation is included.
CN-107683183-A: CN-107683183-A is not in the English language, but an English language translation is included.
DE-202004007111-U1: DE-202004007111-U1 is not in the English language, but an English language translation is included.
U.S. Appl. No. 17/096,405: (a) Office Action dated Jun. 2, 2022. The instant application and U.S. Appl. No. 17/096,405 have an inventor in common and both relate to imaging seeds.
U.S. Appl. No. 16/352,484: (a) Office Action dated Nov. 9, 2021; and (b) Office Action dated Mar. 18, 2022. The instant application and U.S. Appl. No. 16/352,484 have an inventor in common and both relate to imaging seeds.
U.S. Appl. No. 16/496,883: (a) Office Action dated Mar. 29, 2021; (b) Office Action dated Aug. 17, 2021; (c) Office Action dated Dec. 14, 2021; and (d) Office Action dated May 10, 2022. The instant application and U.S. Appl. No. 16/496,883 both relate to imaging seeds.
U.S. Appl. No. 17/251,057: (a) Office Action dated Nov. 15, 2021; and (b) Office Action dated Feb. 10, 2022. The instant application and U.S. Appl. No. 17/251,057 have an inventor in common and both relate to imaging seeds.
U.S. Appl. No. 16/271,005: (a) Office Action dated Jul. 24, 202; (b) Office Action dated Nov. 10, 2020; and (c) Notice of Allowance dated May 4, 2021. The instant application and U.S. Appl. No. 16/271,005 both relate to imaging seeds.

* cited by examiner

SEED SORTING

FIELD

The present disclosure generally relates to a system and method for processing seeds, and more specifically, a seed sorting system and method for sorting seeds based on characteristics of the seed.

BACKGROUND

In the agricultural industry, and more specifically in the seed breeding industry, it is important for scientists to be able to analyze seeds with high throughput. By this it is meant that the analysis of the seeds preferably occurs not only quickly, but also reliably and with high total volume. Historically, seeds are sorted by size using mechanical equipment containing screens with holes corresponding to predetermined sizes. Seed sorting is also conducted using image analysis of the seeds to detect certain appearance characteristics of the seeds. However, prior image analysis seed sorting systems are limited in their ability to detect the size, shape, and appearance of the seeds. As a result, prior image analysis systems have limited capabilities for characterizing seed shape and defects.

SUMMARY

In one aspect, a seed sorting system for sorting seeds generally comprises a seed transfer station configured to move seeds through the system. An imaging assembly comprises a first camera mounted above the seed transfer station and configured to acquire images of the seeds as the seeds move through the system and a second camera mounted below the seed transfer station and configured to acquire images of the seeds as the seeds move through the system. A sorting assembly is configured to sort the seeds into separate bins based on the acquired images of the seeds.

In another aspect, a method of sorting seeds generally comprises moving seeds through the system using a seed transfer station. Acquiring, using a first camera mounted above the seed transfer station, images of the seeds as the seeds move through the system via the seed transfer station. Acquiring, using a second camera mounted below the seed transfer station, images of the seeds as the seeds move through the system via the seed transfer station. Analyzing the images to determine a parameter of each of the seeds. Sorting, using a sorting assembly, the seeds based on determined parameters of the seeds.

BRIEF DESCRIPTION OF THE DRAWING

Corresponding reference characters indicate corresponding parts throughout the drawings.

DETAILED DESCRIPTION

Figure 1:
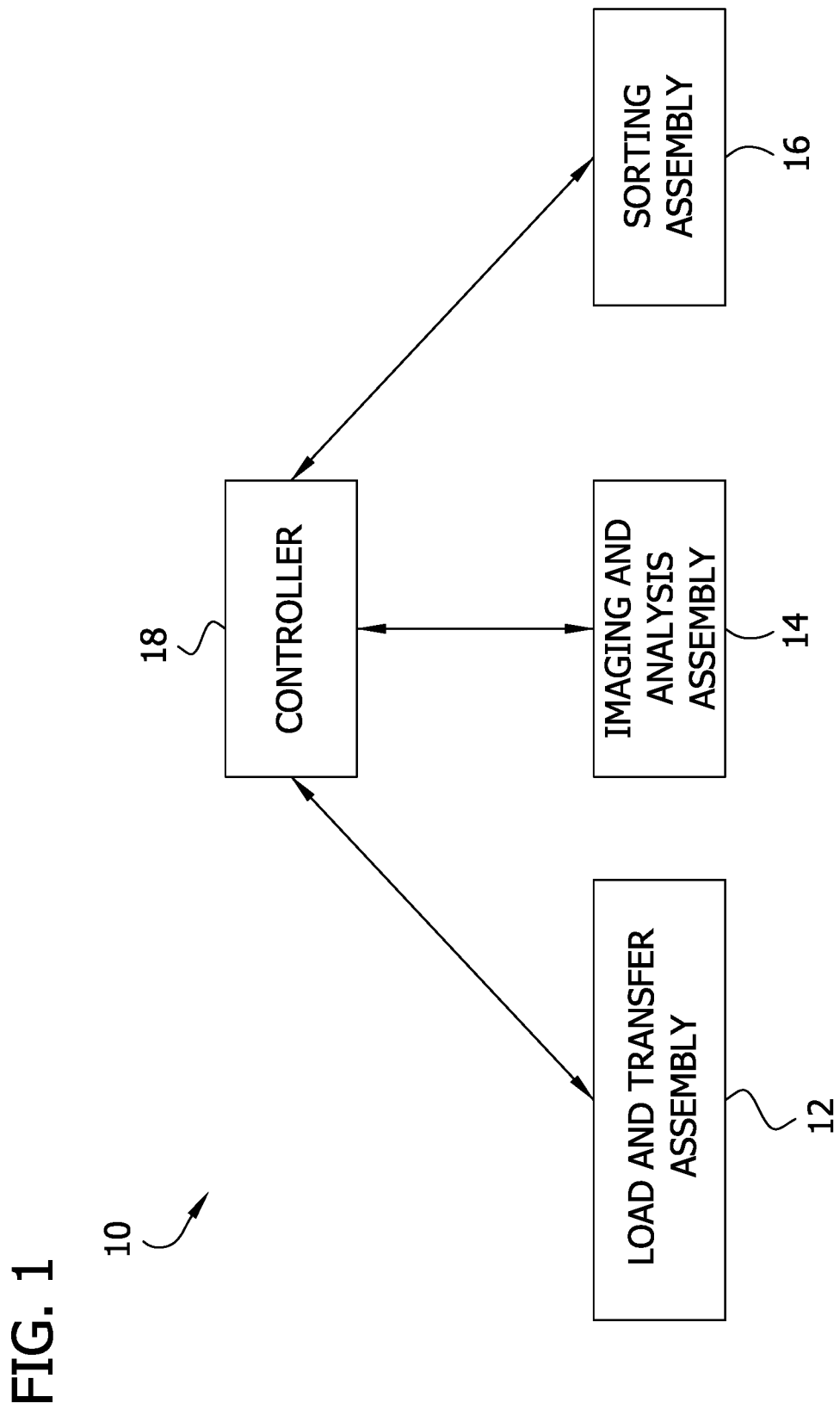
FIG. 1 is block diagram of an automated seed sorter system.

Referring to FIGS. 1-5, a seed sorting system is indicated generally at 10. The system is configured to receive, analyze, and sort a plurality of seeds into selected categories for later processing, assessment, or analysis. The system 10 comprises a load and transfer assembly 12 configured to receive and deliver the seeds through the system, an imaging and analysis assembly 14 for collecting image data of the seeds as they are delivered through the system by the load and transfer assembly, and a sorting assembly 16 configured to sort the seeds into selected categories based on the image data collected for the seeds by the imaging and analysis assembly. A controller 18 (e.g., a processor and suitable memory) is programmed to operate the system 10. The imaging and analysis assembly 14 acquires image data and incorporates optimized image analysis algorithms for providing rapid and highly accurate color, size, shape, and texture measurements of the seeds which provide a complete picture of the appearance of the seeds. Being able to capture the appearance of the seed, and not just the color, allows the system 10 to reliably detect defects in the seeds.

The sorting assembly 16 is configured to sort the seeds into two or more selected categories so that the seeds can be more precisely categorized for later processing, assessment, and/or analysis. For example, seeds determined to be defective by the imaging and analysis assembly 14 can be separated from the healthy/non-defective seeds. Defective seeds may be identified as diseased, discolored, or mechanically damaged seeds, and inert material. However, because healthy/non-defective seeds may not just have color variations, the ability of the imaging and analysis assembly 14 to measure size, shape, and texture, in addition to color, provides a more accurate indication of the condition of the seeds. Additionally, the load and transfer assembly 12, imaging and analysis assembly 14, and the sorting assembly 16 allow the system to provide high throughput measurement of the seeds to meet real time seed sorting requirements. As such, the system 10 can be implemented into an existing seed processing system and quickly and seamlessly provide a seed sorting function.

Figure 2:
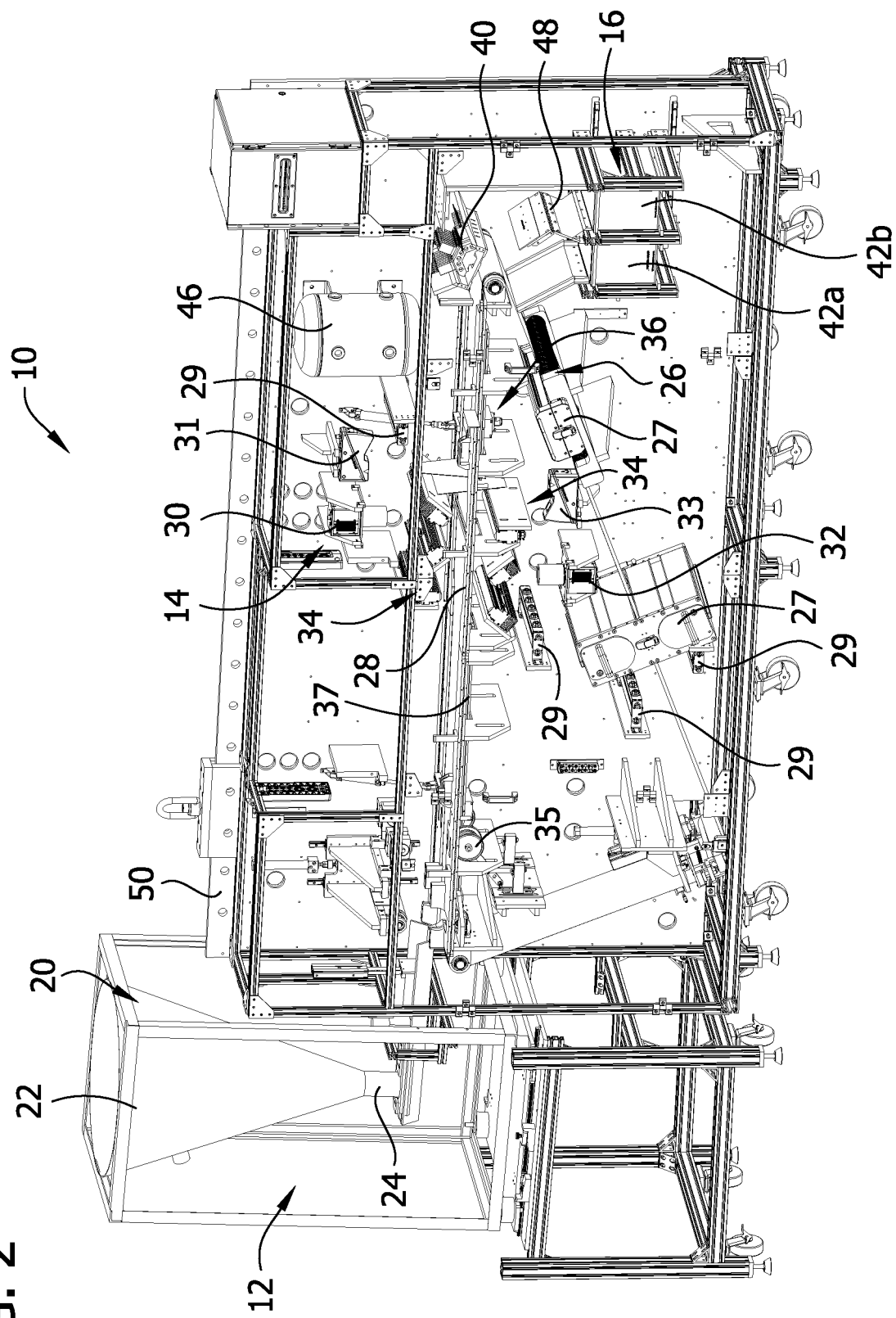
FIG. 2 is a perspective of the seed sorter system.
Figure 3:
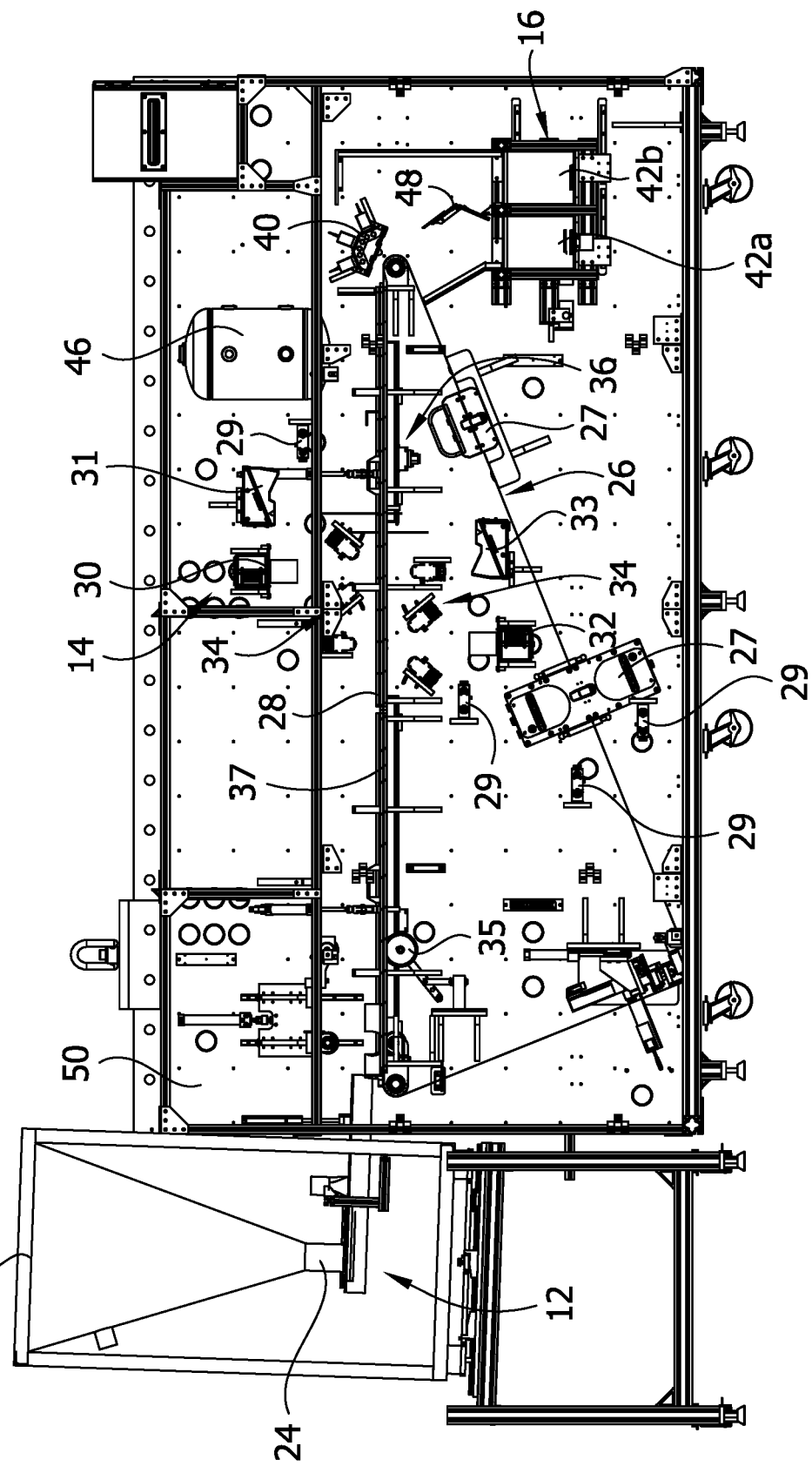
FIG. 3 is a front view of the seed sorter system.
Figure 4:
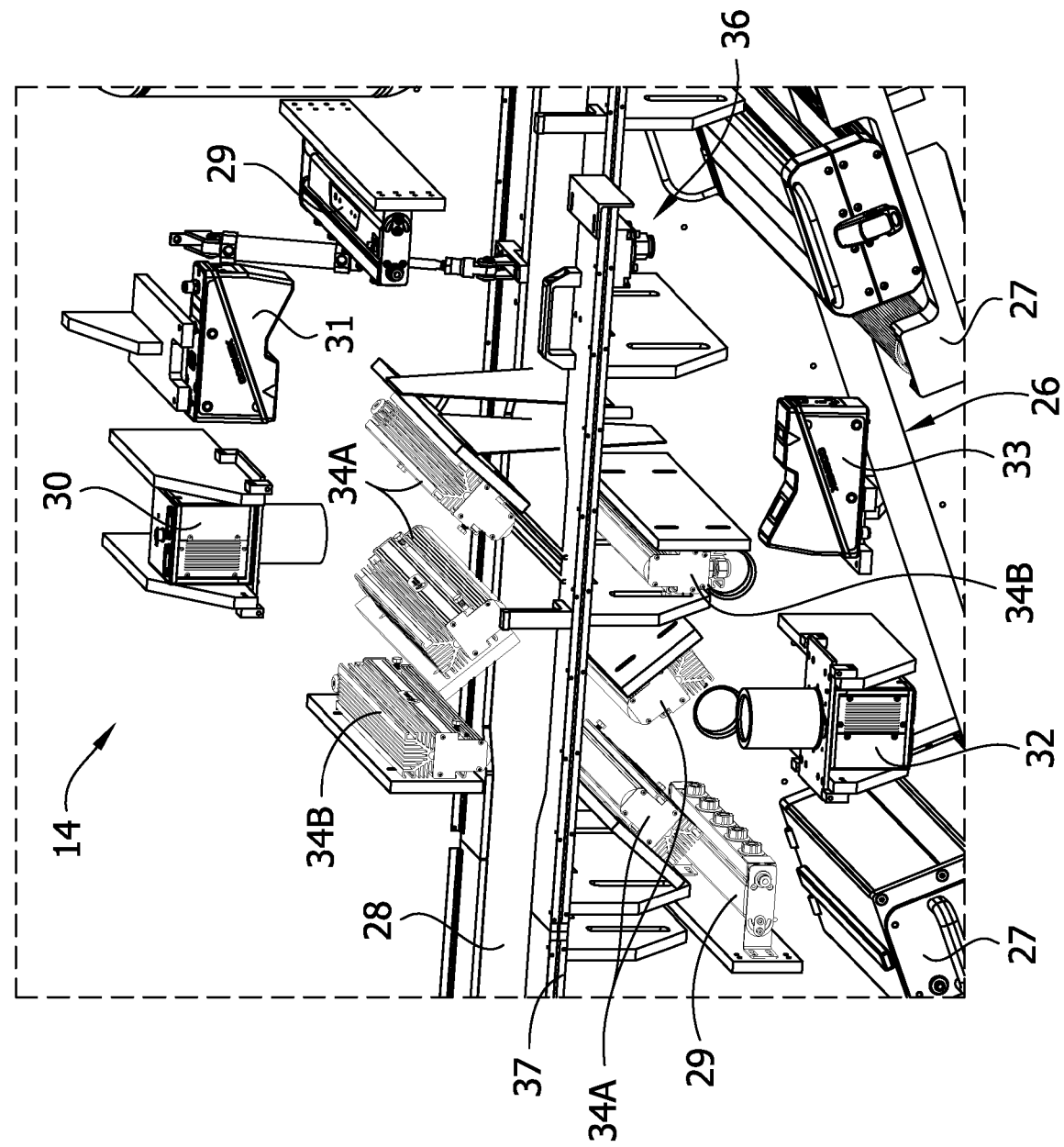
FIG. 4 is a fragmentary perspective of the seed sorter system.
Figure 5:
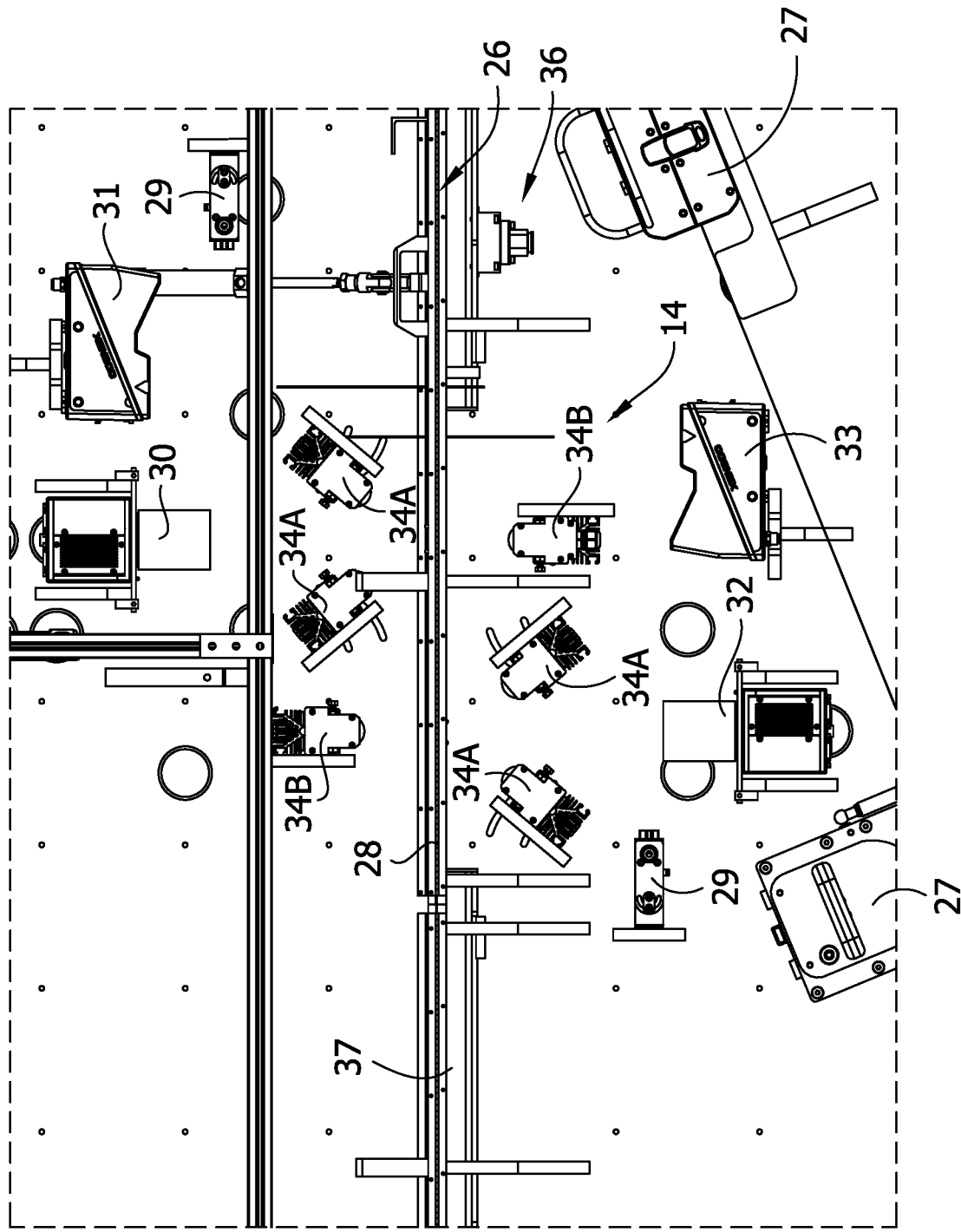
FIG. 5 is an enlarged fragmentary view of the seed sorter system of FIG. 3.
Figure 6:
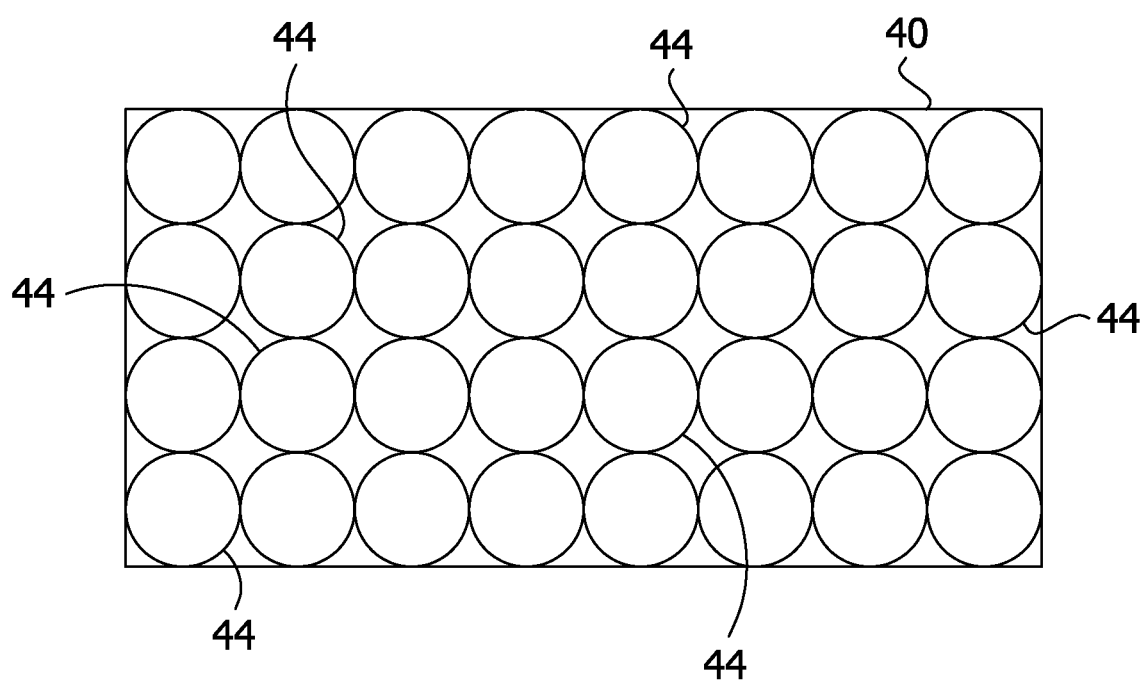
FIG. 6 is a schematic illustration of a valve bank of a sorting assembly.
Figure 6A:
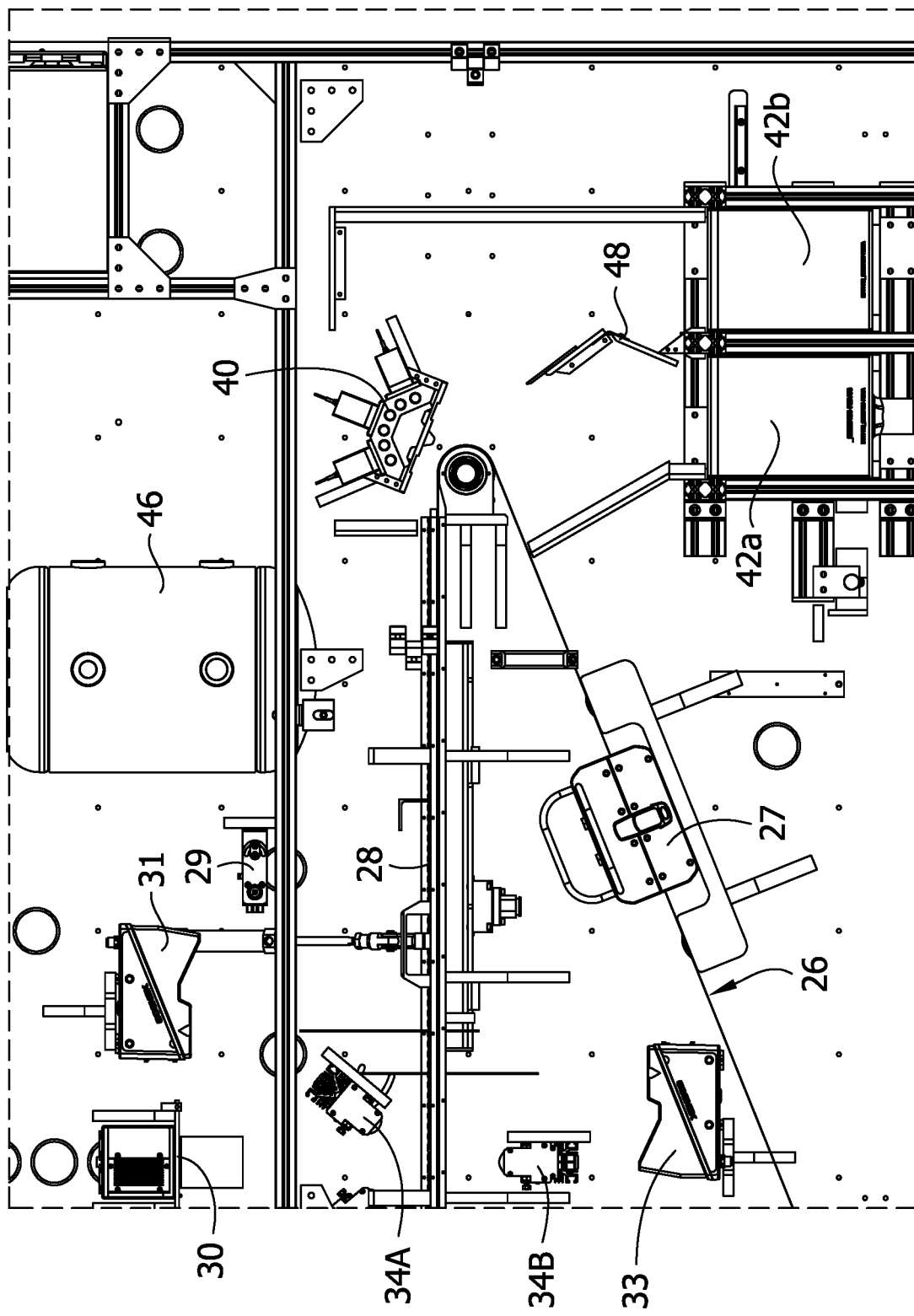
FIG. 6A is an enlarged fragmentary view of the seed sorter system of FIG. 3.
Figure 6B:
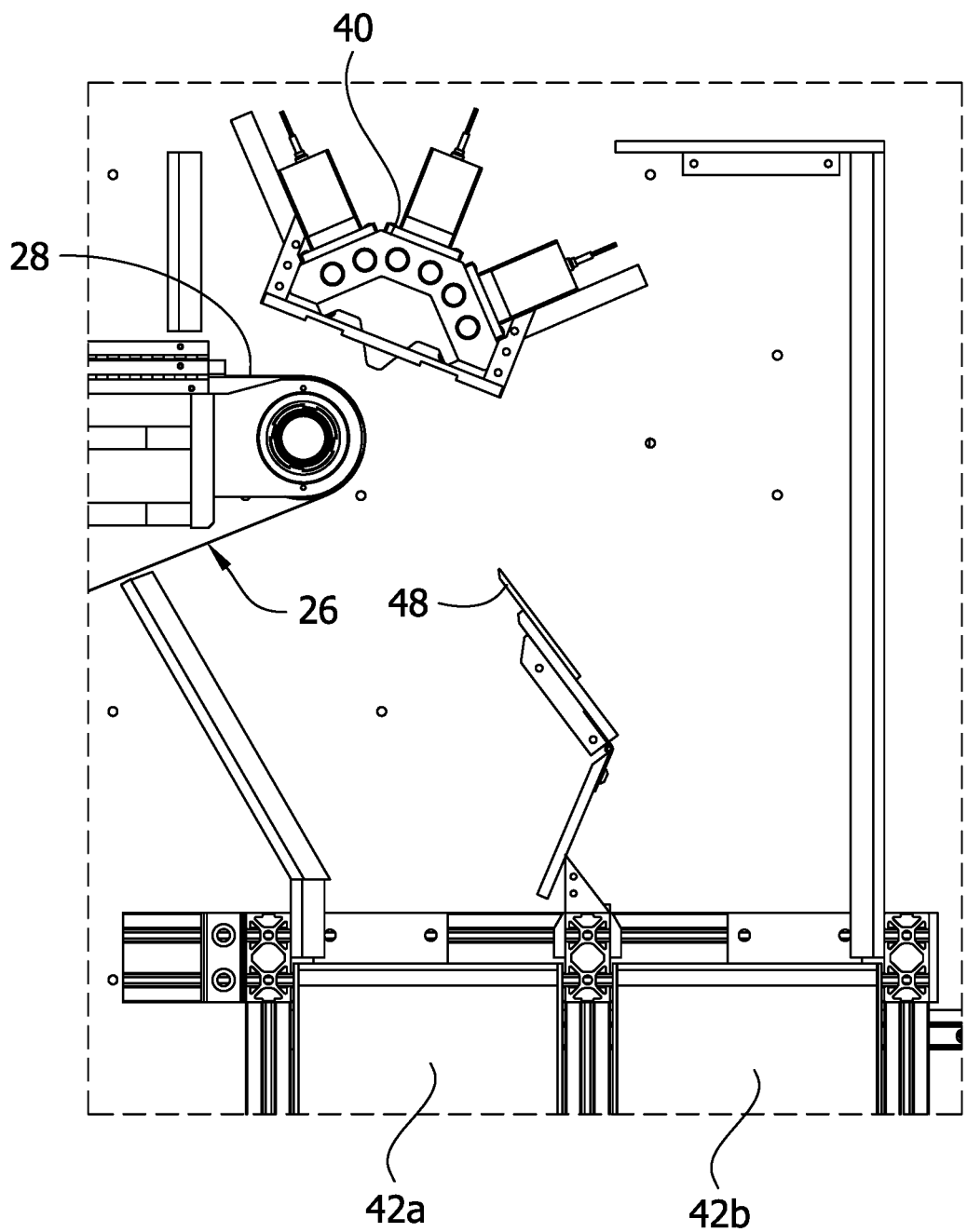
FIG. 6B is an enlarged fragmentary view of the seed sorter system of FIG. 3 showing a sorting assembly.

Referring to FIGS. 2, 3, and 5, the load and transfer assembly 12 comprises a hopper (broadly, a seed loading station) 20 including an inlet 22 for receiving the seeds into the hopper and an outlet 24 for dispensing the seeds from the hopper, and a conveyor 26 (broadly, a seed transfer station) at the outlet of the hopper. In the illustrated embodiment, the conveyor 26 comprises a belt 28 defining a flat horizontal conveyor transport surface. The conveyor 26 provides a flat surface for the seeds to rest as they are delivered through the system 10. As a result, the system 10 is able to better control the travel of each seed through the system and therefore better track the position of the seeds as they move on the conveyor 26 because the seeds will remain in a substantially fixed orientation and position on the conveyor. In one embodiment, a high precision encoder 35 is incorporated into the system 10 to track the position of the seeds on the conveyor 26. As will be explained in greater detail below, the flat surface allows for more accurate measurements to be acquired by the imaging and analysis assembly 14. Moreover, the projectile motion of the seeds as they are expelled off an end of the conveyor 26 provides a predictable flight pattern of each seed which can be used to sort the seeds as will be explained in greater detail below.

The conveyor 26 may be a high-speed conveyor capable of operating at speeds of up to about 40 in/sec and above. For example, the conveyor 26 can be operated at up to about 60 in/sec. The conveyor 26 can deliver the seeds through the system 10 at a rate of about 200 seeds/sec with good seed separation on the conveyor 26 for a four inch wide outlet 24. Feed rates exceeding 1000 seeds/seeds per second are envisioned by using a wider outlet 24, a faster conveyor 26 speed, or an allowance for closer seed spacing on the conveyor 26. In one embodiment, the conveyor 26 is transparent. The transparent nature of the conveyor 26 allows for imaging from underneath the conveyor to be performed, as will be explained in greater detail below. However, the conveyor can be translucent or semi-transparent without departing from the scope of the disclosure. A coating may also be applied to the belt 28 of the conveyor 26. The coating may be configured to repel dust and/or have scratch resistant properties which can help keep the belt 28 clean and free of marks which can impair the ability of the imaging and analysis assembly 14 to acquire clear images. A conveyor support system (not shown) may also be used to support the belt 28 generally in a center of the belt by applying a supporting force without physically touching the belt. For example, the conveyor support system may comprise an air float system 36 including air bars 37 that use air to support the belt 28. This system improves the consistency of the sizing measurement by maintaining the belt 28 at the same height regardless of the weight of the seeds on the belt. Commercially available air bars are manufactured by New Way Air Bearings of Aston Pennsylvania. Additionally or alternatively, a plurality of ionizers 29 may be provided to dissipate static charges on the system 10 to reduce adherence of fine particulate matter on the conveyor 26. Also, web cleaners 27 may be used to clean the conveyor belt 28. For example an adhesive roll or a combined vacuum and pressure unit with feedback to control the airflow and specific geometry may be used to improve the removal of dust from the conveyor belt 28. Commercially available web cleaners are manufactured by Meech International of Witney, United Kingdom.

Referring to FIGS. 2-5, the imaging and analysis assembly 14 comprises a first 2D line scan RGB camera (broadly, a first 2D camera) 30 mounted above the conveyor surface for acquiring image data of the seeds to measure the color, size, shape, and appearance of the seeds in two dimensions and a second 2D line scan RBG camera (broadly, a second 2D camera) 32 mounted below the conveyor surface for acquiring image data of the seeds to measure the color, size, shape, and appearance of the seeds in two dimensions. The imaging and analysis assembly 14 also includes a processor and memory for processing (i.e., analyzing) the image data, although in other embodiments the controller 18 may be used for such processing. The imaging and analysis assembly 14 further comprises a first 3D line laser profiler (broadly, a first 3D camera) 31 mounted above the conveyor surface for acquiring 3D image data of the seeds to measure the size and shape of the seeds in three dimensions and a second 3D line laser profiler (broadly, a second 3D camera) 33 mounted below the conveyor surface for acquiring image data of the seeds to measure the size and shape of the seeds in three dimensions. Because the cameras acquire images from the top and bottom of the seeds, the assembly 14 can acquire a complete picture of the appearance of the seeds in three dimensions. This complete picture includes data concerning the length, width, thickness (or roundness), solidity, and smoothness features for the seeds.

In one embodiment, the top 2D camera 30 is mounted above the conveyor 26 in a substantially vertically orientation such that a focal axis of the camera extends perpendicular to a horizontal plane of the conveyor, and the bottom 2D camera 32 is mounted below the conveyor in a substantially vertically orientation such that a focal axis of the camera extends perpendicular to a horizontal plane of the conveyor. Length and width dimensions of the seeds can be calculated using an image processing routine executed by the controller 18. With the length and width dimensions of the seeds, the areas of each seed can be calculated. Each 2D camera 30, 32 is configured to image a 150 mm lane on the belt 28 of the conveyor 26 with a spatial resolution of about 0.14 mm. One example of a suitable 2D camera is the CV-L107CL model by JAI.

Additionally, each 2D camera 30, 32 has an associated light assembly 34 for illuminating the fields of view of the cameras 30, 32 to assist in producing clear and bright images. Each light assembly 34 comprises a pair of top white lights 34A and a back blue light 34B. The light assemblies 34 provide lighting that compliments the clear conveyor 26 so that the images from the cameras 30, 32 are clear and bright. The field of view for the top 2D camera 30 is illuminated by the white lights 34A mounted above the conveyor surface and the blue light 34B mounted below the conveyor surface. Conversely, the field view for the bottom 2D camera 32 is illuminated by white lights 34A mounted bellow the conveyor surface and the blue light 34B mounted above the conveyor surface. Using only the top and bottom 2D cameras, the imaging assembly 14 is able to image over 90% of the surface of each seed. In a similar embodiment, additional top and/or bottom cameras may be added in orientations off-perpendicular to the conveyor 26. These cameras may be used in conjunction with the top 2D camera 30 and/or the bottom 2D camera 32 for detailed defect inspection over a larger portion of the seed surface area.

In one embodiment, the top 3D camera 31 is mounted above the conveyor 26 in a substantially vertical orientation such that a laser of the camera projects substantially perpendicular to a horizontal plane of the conveyor, and a focal axis of the camera extends at an angle slightly skewed from vertical such that a focal axis of the top 3D camera extends at a non-orthogonal angle to the plane of the conveyor. A bottom 3D camera 33 is mounted below the conveyor in a substantially vertically orientation such that a laser of the camera projects substantially perpendicular to a horizontal plane of the conveyor 26, and a focal axis of the camera extends at an angle slightly skewed from vertical such that a focal axis of the bottom 3D camera extends at a non-orthogonal angle to the plane of the conveyor.

The 3D cameras 31, 33 project a line laser to create a line profile of the seed's surface. The 3D cameras 31, 33 measure the line profile to determine displacement which is represented by an image of the seed showing varying pixel intensities corresponding to height differences. A thickness dimension is obtained through the pixel intensity of the 3D images produced by the 3D cameras 31, 33. For example, a maximum pixel intensity can be interpreted as a marker of seed thickness. Thus, as the seeds pass through the focal windows of the 3D cameras 31, 33, a thickness of each seed is recorded as the maximum pixel intensity detected by the 3D cameras for each seed. To acquire an accurate thickness measurement, it may be necessary to calibrate the image intensity of the 3D cameras 31, 33 based on the distance the 3D cameras are spaced from the surface of the conveyor 26. Using the length and width dimensions acquired from the 2D cameras 30, 32 and the thickness dimensions acquired from the 3D cameras 31, 33, the system 10 can obtain volume estimates for each seed. In another embodiment, more sophisticated image processing may be used to estimate volume from a detailed contour map of the top half of each seed. Moreover, a second bottom 3D camera could generate a detailed contour map of the bottom half of the seed. In either case, for a known or estimated weight of the seed, the volume data can be used to estimate seed density. One example of a suitable 3D camera is the DS1101R model by Cognex.

The imaging and analysis assembly 14 is also configured to determine circularity, solidity, and smoothness from the images produced. It will be understood by those skilled in the art that the system 10 may include image analysis software for processing the images to obtain the color, size, shape, and texture information (features) for the seeds. The software may incorporate machine learning methods to analyze the produced images or the computed image features and to classify the images into different categories.

Referring to FIGS. 2, 3, and 6-6B, the sorting assembly 16 comprises a high-speed air valve bank 40 and a plurality of sorting bins 42 located at an end of the conveyor 26 for sorting the seeds into at least two different categories based on the measurements obtained by the imaging and analysis assembly 14. The valve bank 40 includes multiple air valves 44 in fluid communication with an air compressor 46 for producing burst of air directed at the seeds as they are expelled from the conveyor 26. The air is used to redirect the flight of the seeds so that the seeds land in a selected sorting bin 42 corresponding to the characteristics of the seeds identified by the imaging and analysis assembly 14. As previously mentioned, the seeds are tracked by a high precision encoder 35. Thus, the system 10 can monitor the path of the seeds and predict when and where the seeds will be expelled from the conveyor 26. Therefore, the system 10 can predict the location and flight of each seed as it leaves the conveyor 26. This information is used by the controller 18 to instruct the operation of the valves 44 in the valve bank 40. In one embodiment, the valve bank 40 includes thirty two (32) air valves 44. However, a different number or air valves is envisioned without departing from the scope of the disclosure. The array of valves 44 is provided in an adequate number and arrangement to locate the valves in position to accommodate the random placement of the seeds on the conveyor.

In the illustrated embodiment, there is one (1) valve bank 40 selectively positioned for sorting the seeds into two (2) sorting bins 42. A first sorting bin 42a is located closest to the conveyor 26 and a second sorting bin 42b is located next to the first sorting bin and located farther from the conveyor than the first sorting bin. An adjustable seed divider 48 may be disposed between the sorting bins 42. The position and configuration of the seed divider 48 can be adjusted to affect the desired divider function. The valve bank 40 is disposed generally over the first sorting bin 42a and directed downward such that the bursts of air from the valves 44 in the first valve bank create a downward diverting force along a substantially vertical axis. This downward diverting force can redirect the path of a seed as it leaves the conveyor 26 so that the seed falls into the first sorting bin 42a. Thus, if a seed is not redirected by the valve bank 40, the seed will land in the second sorting bin 42b as a result of the natural trajectory of the seed leaving the conveyor 26. It will be understood that the conveyor 26 can be operated and/or the sorting bins 42 can be positioned so that the natural flight of the seeds will land the seeds in the first sorting bin 42a.

It will be understood that the valve bank 40 could be located in a different position to redirect the seeds along different paths. For example, in the embodiment where natural trajectory of the seeds causes them to fall into the first sorting bin 42a, a valve bank may be located in the first sorting bin 42a to redirect the seeds into the second sorting bin 42b. Moreover, additional valve banks could be used for sorting the seeds into more than two bins. For example, a valve bank could be located above the second sorting bin 42b for redirecting seeds into a third sorting bin (not shown). Other mechanisms for sorting the seeds can be used without departing from the scope of the disclosure.

In the illustrated embodiment, the conveyor 26, imaging and analysis assembly 14, and sorting assembly 16 are mounted to a support wall 50. However, the components of the system 10 could be located in a different fashion without departing from the scope of the disclosure.

Referring to FIGS. 2 and 3, seeds are first placed in the hopper 20 in preparation of being transported by the conveyor 26 through the system 10. As the seeds leave the outlet 24 of the hopper 20, the conveyor carries the seeds into view of the cameras 30-33. Because the seeds travel along the flat, clear conveyor 26, clear image data are acquired from both the top and bottom cameras 30-33. Additionally, the seeds remain in a known location and fixed orientation on the conveyor 26 which allows each seed to be tracked with a high level of accuracy by the precision encoder 35 and the imaging and analysis assembly.

In the illustrated embodiment, the seeds first pass through the focal view of the bottom 2D camera 32. The bottom 2D camera 32 acquires a 2-dimensional image of each seed which is processed by the controller 18 to produce length and width data for each seed. In one embodiment, the value associated with a maximum length and width measurements are recorded as the length and width values for the seed. An encoder reading may also be recorded as the seed is imaged by the bottom 2D camera 32 to track the position of the seed on the conveyor 26. Next the seeds pass through the focal view of the top 2D camera 30. The top 2D camera 30 acquires a 2-dimensional image of each seed which is processed by the controller 18 to produce length and width data for each seed. In one embodiment, the value associated with a maximum length and width measurements are recorded as the length and width values for the seed. An encoder reading may also be recorded as the seed is imaged by the top 2D camera 30 to track the position of the seed on the conveyor 26. Alternatively, the bottom 3D camera 33 can be positioned ahead of the bottom 2D camera 32 so that the 3D image data is acquired first.

Figure 7:
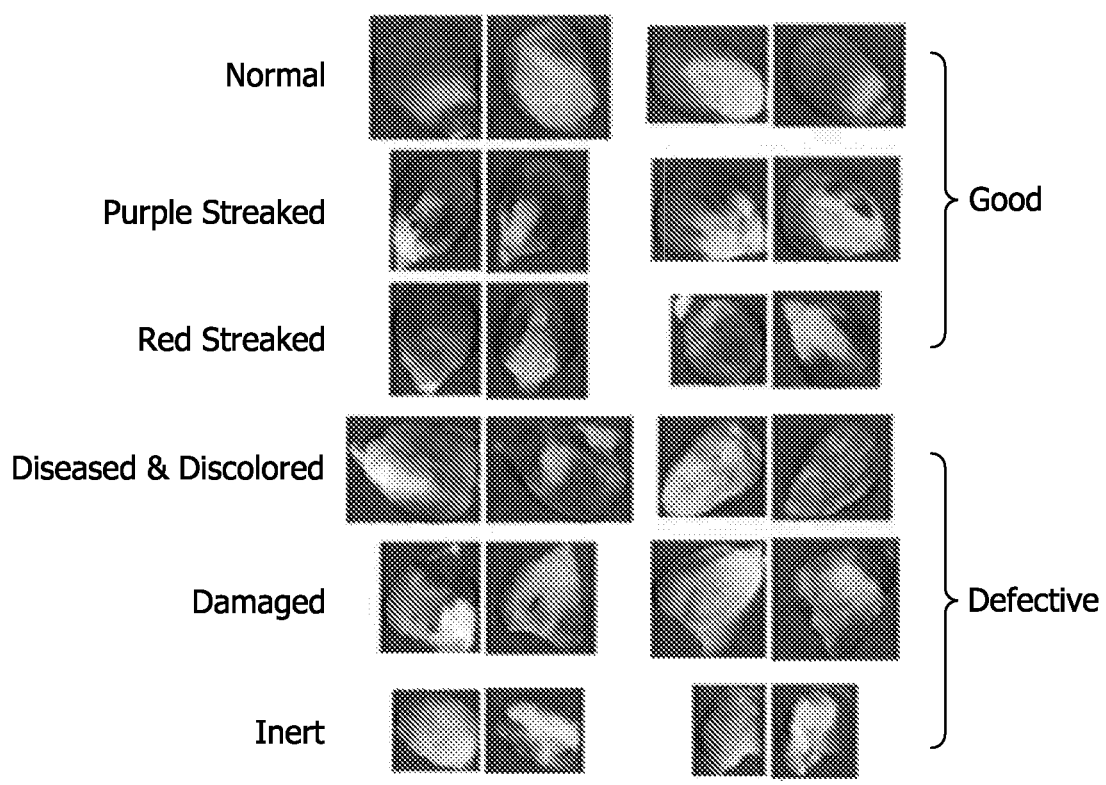
FIG. 7 are images obtained by cameras of the seed sorter system.

The seeds continue to travel along the conveyor 26 until the seeds pass under the focal view of the bottom 3D camera. 33. The bottom 3D camera 33 acquires a 3-dimensional image of each seed which is processed by the controller 18 to produce thickness data for each seed. An encoder reading may also be recorded as the seed is imaged by the bottom 3D camera 33 to track the position of the seed on the conveyor 26. Next the seeds pass under the focal view of the top 3D camera 31. The top 3D camera 31 acquires a 3-dimensional image of each seed which is processed by the controller 18 to produce thickness data for each seed. An encoder reading may also be recorded as the seed is imaged by the top 3D camera 31 to track the position of the seed on the conveyor 26. FIG. 7 shows representative images acquired by the top and bottom cameras 30-33.

Based on the measurement data from the cameras 30-33, the controller 18 can identify and categorize each seed according to its appearance (and shape and size). For example, predetermined appearance categories may be stored in the controller 18. The appearance categories may be based on measurement thresholds or ranges for each of the color, length, width, circularity, solidity, and smoothness data. Based on these thresholds/ranges, at least two categories can be defined. For example, the measurement data can be used to provide thresholds or ranges which indicate the seed as either healthy or defective. Each sorting bin 42 is representative of a category. Thus, in the illustrated embodiment, the two sorting bins 42a, 42b represent the defective and healthy categories, respectively. As each seed is analyzed the seed is associated with one of the categories. For example, a seed having one or more dimensions that are outside of a range of values, or above/below a threshold value, are categorized into a first, defective category; and seeds having one or more dimensions that are within a range of values, or above/below a threshold value, are categorized into a second, healthy category. Multiple range/threshold values may be established to further categorize the seeds into more than two categories. Once a seed reaches the end of the conveyor 26, the valve bank 40 is operated by the controller 18 to divert the seed into the bin 42 associated with its designated category.

In some instances, depending on the type of sorter and the tolerances set by the system 10, the system may inadvertently direct healthy seeds into the defective bin. This is often a result of the sorting systems being operated to ensure that most all of the defective seeds are identified. By doing this, healthy seeds can be included with the defective seeds. In one embodiment, the seeds that are directed into the defective bin are placed back into the hopper 20 to be run through the system again.

Figure 8:
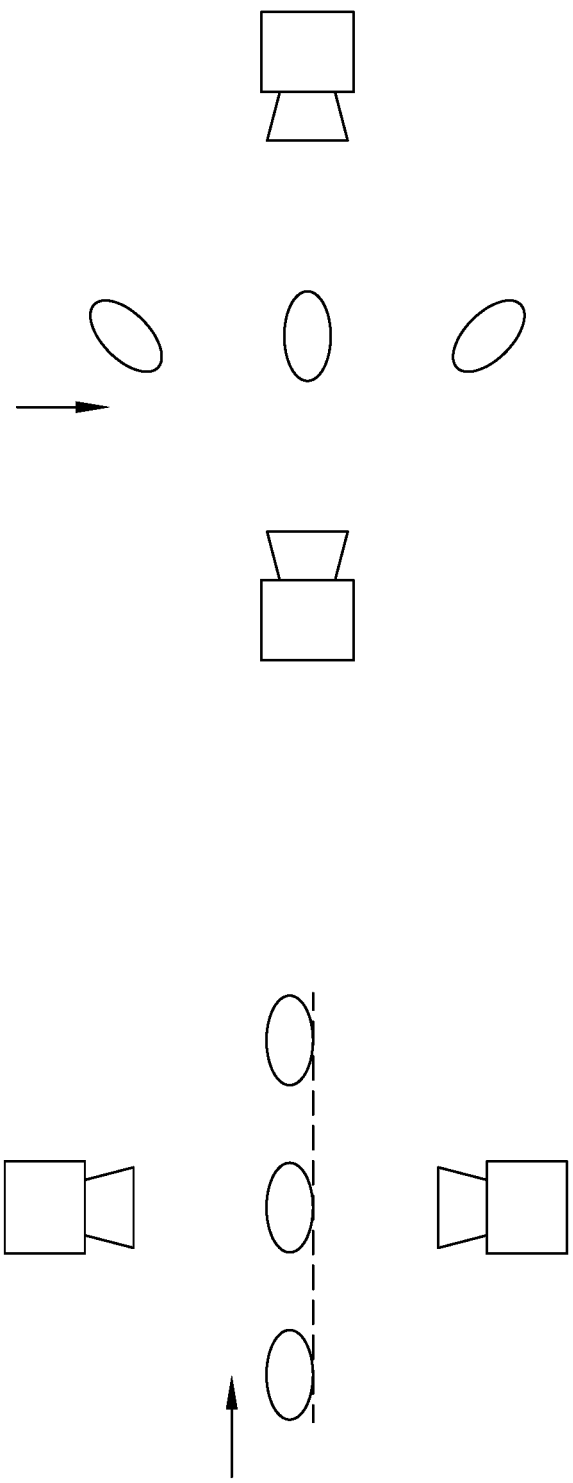
FIG. 8 is a schematic illustration of the seed sorter system compared to a prior art seed sorter.

Referring to FIG. 8, the disclosed sorting method whereby the seeds are transported along a substantially horizontal transport surface is an improvement over prior art sorting systems that place the seeds in a free fall and image the seeds during the free fall. In the prior art systems, the orientation and position of the seeds cannot be as reliably predicted so the images that are produced may not provide a complete picture of the appearance of the seeds. For example, only a small section of a seed may be visible to the cameras as the seed changes its orientation during free fall. Also, prior art sorting systems have short computation times and primarily rely on color distinctions to categorize the seeds as being healthy or defective. As explained earlier, relying solely on color distinctions may cause healthy seeds to be indicated as being defective. Further, sorting is more easily and accurately accomplished with the current horizontal transport design because the seeds are presented in a more consistent and repeatable fashion and the system is afforded more time to make the necessary categorizing decisions. As a result, sorting by the current system 10 has been found to be at least about 96% accurate in correctly sorting healthy and defective seeds. This is believed to be more than 17% more accurate than the sorting systems of the prior art. This is also in part due to the prior art systems having difficulty differentiating the heathy and defective seeds based on color and their inability to detect small defects in the seeds. Additionally, the sorting method of the current disclosure could be used to supplement a sorting procedure done using a prior art gravity table sorter.

The information obtained using the imaging and analysis assembly 14 can be useful in the subsequent processing, assessment, or analysis of the seeds. For example, in seed production plants, the data generated by the system 10 can be used to predict an overall distribution of defective seeds of any seed size category in a seed inventory, and to determine the distribution of defective seeds of a sub sample of seeds which can then be extrapolated to predict the overall seed inventory status. This distribution information may also be used to estimate seed quantities by commercial size categories and adjust sizing thresholds slightly in cases where seed quantities are limited. The sorted seeds can also be used in seed quality labs for assessing seed quality for each size and shape category. The system also allows for the inclusion of additional detection techniques such as hyperspectral and X-ray imaging which can be beneficial in assessing seed quality by combinatorial prediction from multiple imaging techniques taken together.

The imaging-based features are used to identify the various defect types. For example, the imaging routines do not explicitly detect disease and damage. However, the system 10 identifies relevant imaging features that when combined reliably identify these defect types based on training sets comprised of the relevant defect categories. As a result, normal seeds are discriminated from abnormal categories such as damage (including broken seeds and cracks), disease, and discolored seeds using imaging-based features related to color, color variation, shape, estimated size/volume, and surface texture.

Figure 9:
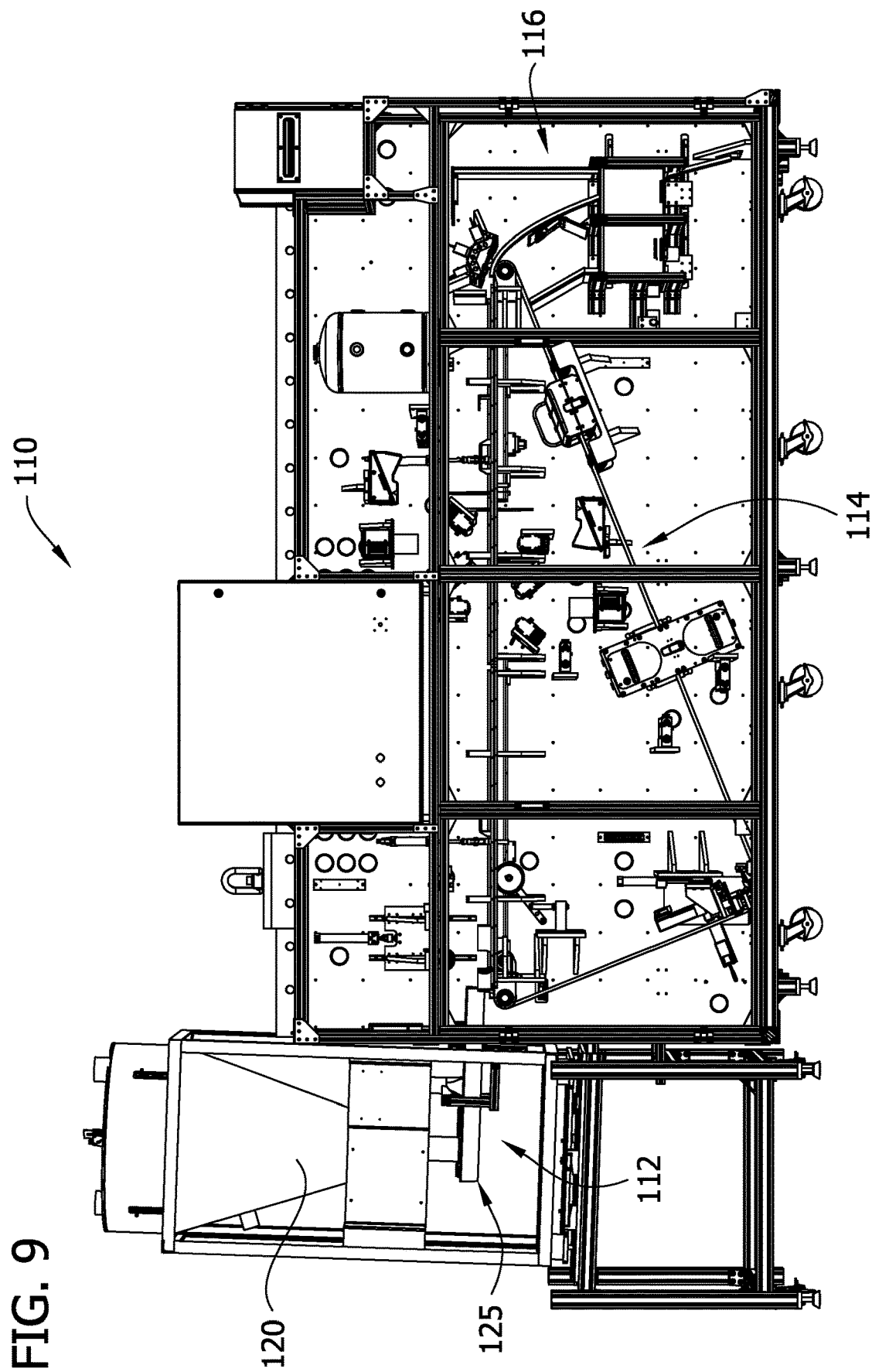
FIG. 9 is a front view of a seed sorter system of another embodiment.
Figure 10:
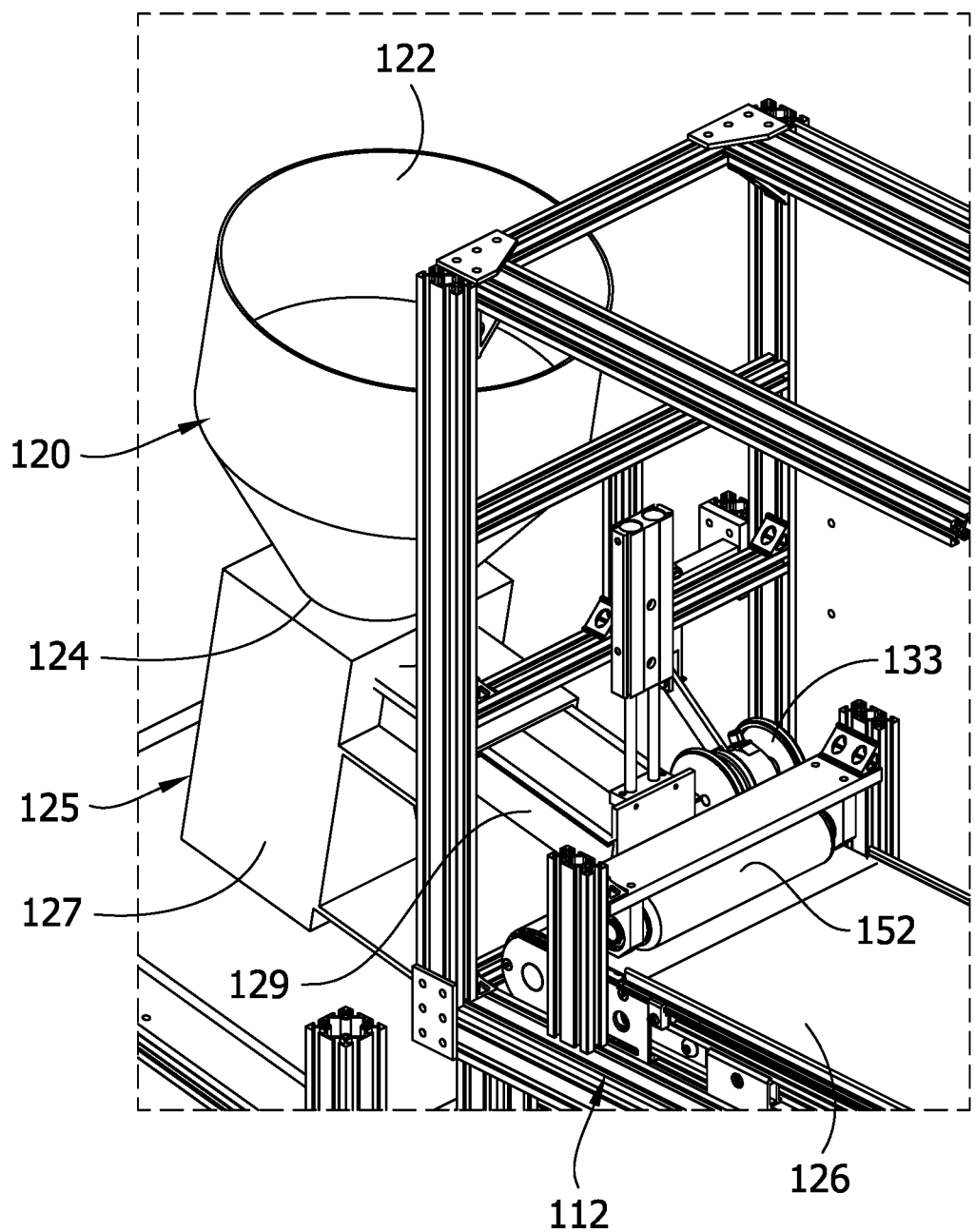
FIG. 10 is an enlarged fragmentary perspective of a load and transfer assembly of the seed sorter system of FIG. 9.
Figure 11:
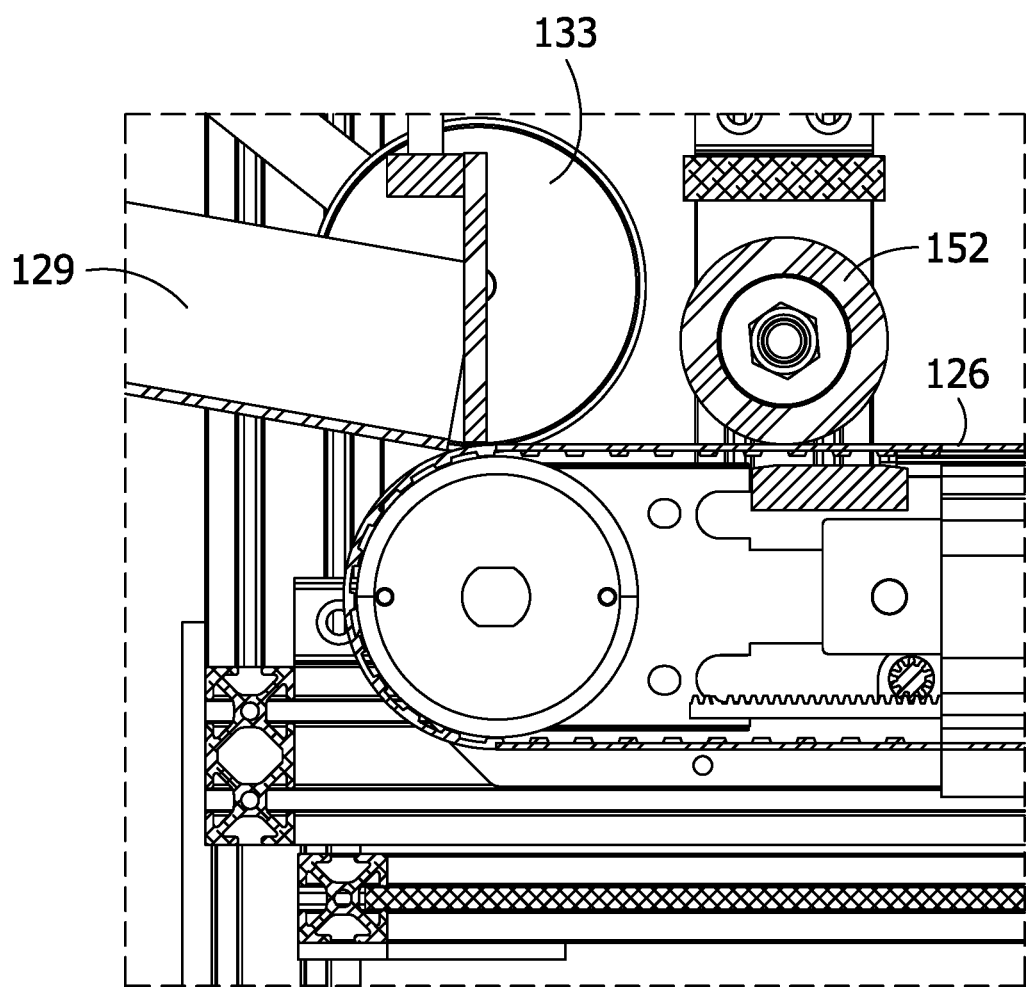
FIG. 11 is an enlarged fragmentary front view of the load and transfer assembly of the seed sorter system of FIG. 9.

Referring to FIGS. 9-11, a seed sorting system of another embodiment is indicated generally at 110. The system 110 of the second embodiment is similar to the system 110 of the first embodiment except as described hereinafter. Accordingly, like components are indicated by corresponding reference numerals plus 100. Just like the seed sorting system 10 of the first embodiment, system 110 is configured to receive, analyze, and sort a plurality of seeds into selected categories for later processing, assessment, or analysis. The system 110 comprises a load and transfer assembly 112 configured to receive and deliver the seeds through the system, an imaging and analysis assembly 114 for collecting image data of the seeds as they are delivered through the system by the load and transfer assembly, and a sorting assembly 116 configured to sort the seeds into selected categories based on the image data collected for the seeds by the imaging and analysis assembly.

The load and transfer assembly 112 comprises a hopper (broadly, a seed loading station) 120 including an inlet 122 for receiving the seeds into the hopper and an outlet 124 for dispensing the seeds from the hopper, a vibratory feed 125 at the outlet for singulating the seeds as they are dispensed from the outlet, and a conveyor 126 (broadly, a seed transfer station) at an outlet of the vibratory feed. The vibratory feed 125 comprises a vibratory feeder 127, and a vibratory channel 129 associated with the vibratory feeder. The vibratory feeder 127 uses vibratory energy to transport the seeds along the vibratory channel 129 and spread the seeds across the area of the conveyor 126. Vibratory feed rates may be controlled by a controller.

The feed rate can be adjusted by the control system by varying the vibration frequency of the vibratory feeder 127. The seeds fall off of the end of the vibratory channel 129 onto the moving conveyor 126. The seeds are then pinched to the conveyor 126 by a foam roller 152 which is in contact with the conveyor and therefore speed matched to the conveyor. During the momentary contact between the seeds and the foam roller 152 the seeds are accelerated to match the speed of the conveyor 126. This mechanism minimizes the relative motion of the seeds and the conveyor 126, and after the seeds pass the foam roller 152 they are settled into a stable position on the conveyor.

Although a vibratory feed 125 is shown, it is envisioned that other methods for singulating the seeds can be used. In one embodiment, a singulation wheel (not shown) can be used. Additionally, an encoder 133 is located at an outlet of the vibratory feed 125. The encoder 133 tracks the motion of the conveyor 126 to facilitate the tracking of the seeds on the conveyor by the imaging assembly 114.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained. As various changes could be made in the above constructions and methods without departing from the scope of the invention, it is intended that all matter contained in the above description and shown in the accompanying drawings shall be interpreted as illustrative and not in a limiting sense.

What is claimed is:

1. A seed sorting system for sorting seeds, the system comprising:
    a seed transfer station configured to move seeds through the system, wherein the seed transfer station comprises a conveyor including a belt having a flat upper surface and configured to transport the seeds in a substantially linear horizontal direction at a speed of at least about 40 in/sec, and wherein the belt is transparent or semi-transparent;
    a loading assembly comprising a loading station positioned at a longitudinal end of the belt of the conveyor and an accelerator disposed at an outlet of the loading station, the loading station configured to deliver the seeds to the belt of the conveyor and spread the seeds across a width of the belt of the conveyor, and the accelerator configured to compress the seeds against the flat upper surface of the belt of the conveyor to thereby match a speed of the seeds to the speed of the belt of the conveyor as the seeds leave the outlet of the loading station;
    an imaging assembly comprising a first camera mounted above the seed transfer station and configured to acquire images of the seeds as the seeds move through the system and a second camera mounted below the seed transfer station and configured to acquire images of the seeds as the seeds move through the system;
    a sorting assembly configured to sort the seeds, from the belt of the conveyor, into separate bins based on the acquired images of the seeds;
    an air float system configured to support the flat upper surface of the belt of the conveyor between the loading station and the sorting assembly at a same height regardless of a weight of seeds on the belt, the air float system including air bars configured to support the flat upper surface of the belt of the conveyor with air at said same height without physically touching the belt; and
    a controller configured to determine, using a seed analysis algorithm, at least one of circularity, solidity, and smoothness data of the seeds from the acquired images of the seeds.

2. The seed sorting system of claim 1, wherein the controller is configured to further determine length and width dimensions, and volume of the seeds from the acquired images, and to control the sorting assembly to sort the seeds based on the determined length and width dimensions, volume, and the determined circularity, solidity, and smoothness data of the seeds.

3. The seed sorting system of claim 2, wherein the controller incorporates machine learning methods to analyze the acquired images and to classify the images into different categories.

4. The seed sorting system of claim 1, wherein each camera has a focal axis extending in a substantially vertical direction.

5. The seed sorting system of claim 1, wherein the first and second cameras are 2D cameras.

6. The seed sorting system of claim 1, wherein the imaging assembly further comprises a third camera mounted above the seed transfer station and configured to acquire images of the seeds as the seeds move through the system and a fourth camera mounted below the seed transfer station and configured to acquire images of the seeds as the seeds move through the system.

7. The seed sorting system of claim 1, wherein the sorting assembly comprises at least one valve bank and a plurality of sorting bins, the at least one valve bank being operable by the controller to sort the seeds into the sorting bins as the seeds leave the seed transfer station, and wherein the at least one valve bank is mounted over a first sorting bin and is directed downward in a substantially vertical orientation, the seed transfer station being configured to direct seeds into the second sorting bin, the at least one valve bank being operable to direct seeds away from the second sorting bin and into the first sorting bin.

8. The seed sorting system of claim 1, wherein the accelerator includes a roller in contact with the belt of the conveyor to thereby match a rotational speed of the roller to the speed of the belt of the conveyor, the roller configured to compress the seeds against the flat upper surface of the belt of the conveyor and accelerate the seeds as they are delivered to the belt of the conveyor.

9. The seed sorting system of claim 1, further comprising a light assembly comprising a pair of white lights disposed on one side of the seed transfer station, and a blue light disposed on an opposite side of the seed transfer station.

10. The seed sorting system of claim 1, wherein the second camera is disposed to acquire images of a portion of the seed path located upstream from a portion of a seed path the first camera is disposed to acquire.

11. The seed sorting system of claim 1, further comprising ionizers to dissipate static charges on the system.

12. The seed sorting system of claim 1, further comprising a vibratory feeder disposed between the loading station and the accelerator for singulating the seeds as they are dispensed from the outlet of the loading station.

13. A method of sorting seeds, the method comprising:
    delivering seeds from a loading station of a seed sorting system to a longitudinal end portion of a conveyor of a seed transfer station of the system such that the seeds are spread across a width of the conveyor;

accelerating the seeds as they leave an outlet of the loading station and are delivered to the conveyor by compressing the seeds against the conveyor, to thereby substantially match a speed of the delivered seeds to a speed of the conveyor;

moving the seeds through the seed sorting system using the conveyor of the seed transfer station at a speed of at least about 40 in/sec, the conveyor including a transparent or semi-transparent belt configured to transport the seeds in a substantially linear horizontal direction;

acquiring, using a first camera mounted above the seed transfer station, images of the seeds as the seeds move through the system via the seed transfer station;

acquiring, using a second camera mounted below the seed transfer station, images of the seeds as the seeds move through the system via the seed transfer station;

analyzing the images of the seeds to determine, for each of the seeds, a circularity of the seed, a solidity of the seed, and a smoothness of the seed;

categorizing, by a controller using machine learning and one or more training sets comprising different categories of seeds, each of the seeds into one of the different categories of the one or more training sets based on the determined circularity of the seed, solidity of the seed, and/or smoothness of the seed; and sorting, using a sorting assembly, each of the seeds based on the category of the seed.

14. The method of claim 13, wherein analyzing the images further comprises determining, using the controller, length, width and thickness dimensions, and volume of the seeds from the acquired images.

15. The method of claim 14, wherein the different categories of the one or more training sets include a healthy seed category and a defective seed category.

16. The method of claim 13, wherein sorting the seeds comprises operating at least one valve bank to sort the seeds into at least two separate sorting bins, a first sorting bin representing a healthy seed category and a second sorting bin representing a defective seed category.

17. The method of claim 13, wherein accelerating the seeds includes matching a speed of a roller, in contact with the belt of the conveyor, to a speed of the belt of the conveyor; and wherein compressing the seeds against the conveyor includes compressing the seeds, by the roller, against the belt of the conveyor and substantially matching a speed of the delivered seeds, by the roller, to the speed of the belt of the conveyor.

18. The method of claim 13, further comprising illuminating a field of view of at least one of the first and second cameras using a light assembly, the light assembly comprising a pair of white lights disposed on one side of the seed transfer station, and a blue light disposed on an opposite side of the seed transfer station.

19. A seed sorting system for sorting seeds, the system comprising:
a seed transfer station including a conveyor configured to move seeds through the system;
a loading station positioned at a longitudinal end of the conveyor, the loading station configured to deliver the seeds to the conveyor of the seed transfer station and spread the seeds across a width of the conveyor;
a roller disposed at an outlet of the loading station and in contact with the conveyor, wherein movement of the conveyor causes rotational movement of the roller such that a rotational speed of the roller matches a speed of the conveyor, the roller configured to compress the seeds against a flat upper surface of the conveyor as the seeds leave the outlet of the loading station and match a speed of the seeds delivered to the seed transfer station to the speed of the conveyor;
an imaging assembly configured to acquire images of the seeds as the seeds move through the system;
a sorting assembly configured to receive the seeds from the seed transfer station and sort the seeds into separate bins based on the acquired images of the seeds; and
an air float system configured to support the conveyor between the loading station and the sorting assembly.

20. The seed sorting system of claim 19, further comprising an encoder positioned adjacent the roller, the encoder configured track a position of the seeds on the conveyor as the seeds move through the system; and
wherein the sorting assembly is configured to sort the seeds from the conveyor into the separate bins further based on the position of the seeds on the conveyor as tracked by the encoder.

* * * * *